United States Patent

[11] 3,542,123

[72] Inventors David R. Hornbaker
1520 Cole Way, La Habra, 90631;
Dieter L. Rall, 11818 E. North Circle Drive, Whittier, California 90601
[21] Appl. No. 737,572
[22] Filed June 17, 1968
[45] Patented Nov. 24, 1970

[54] TEMPERATURE MEASUREMENT APPARATUS
22 Claims, 8 Drawing Figs.
[52] U.S. Cl.................................................. 165/39; 219/516
[51] Int. Cl.................................................. B60h 1/00
[50] Field of Search.................................... 165/39, 40, 48, 104, 26, 138, 30, 64; 219/516, 450

[56] References Cited
UNITED STATES PATENTS

| | | | |
|---|---|---|---|
| 2,811,856 | 11/1957 | Harrison | |
| 3,099,160 | 7/1963 | Werner | |
| 3,232,113 | 2/1966 | Malone | |
| 2,377,177 | 5/1945 | Pfleumer | 165/133 |
| 3,143,167 | 8/1964 | Vieth | 165/64 |
| 3,235,709 | 2/1966 | Fischer | 219/516 |

FOREIGN PATENTS

| | | |
|---|---|---|
| 665,486 | 1/1952 | Great Britain |
| 815,856 | 10/1951 | Germany |

*Primary Examiner*—Charles Sukalo
*Attorney*—Fulwider, Patton, Rieber, Lee & Utecht ABSTRACT: Temperature detection apparatus including a thermal sink or reference body mounting a heat flow sensor, and operative to determine the temperature of an external medium or body by utilizing the principle that net heat exchange between the reference body and the external body will be zero when the bodies are at the same temperature, the apparatus in one embodiment having the heat flow sensor mounted generally flush with the operative face of the reference body for optimum sensitivity to convective heat exchange between the bodies, the apparatus in another embodiment having the heat flow sensor connected in series with a temperature sensor to provide a combined signal proportional to the sum of the temperature of the reference body and the temperature differential between the bodies.

INVENTORS.
DAVID R. HORNBAKER
DIETER L. RALL
BY Fulwider, Patton, Rieber,
Lee and Utecht
ATTORNEYS

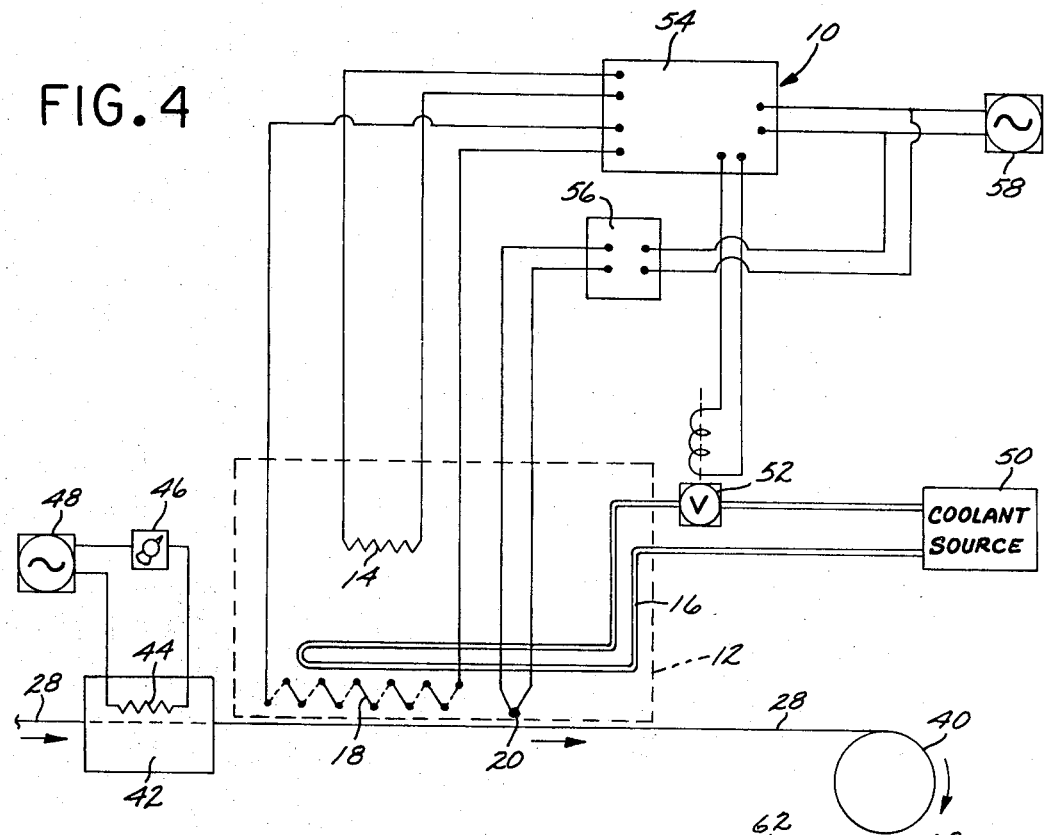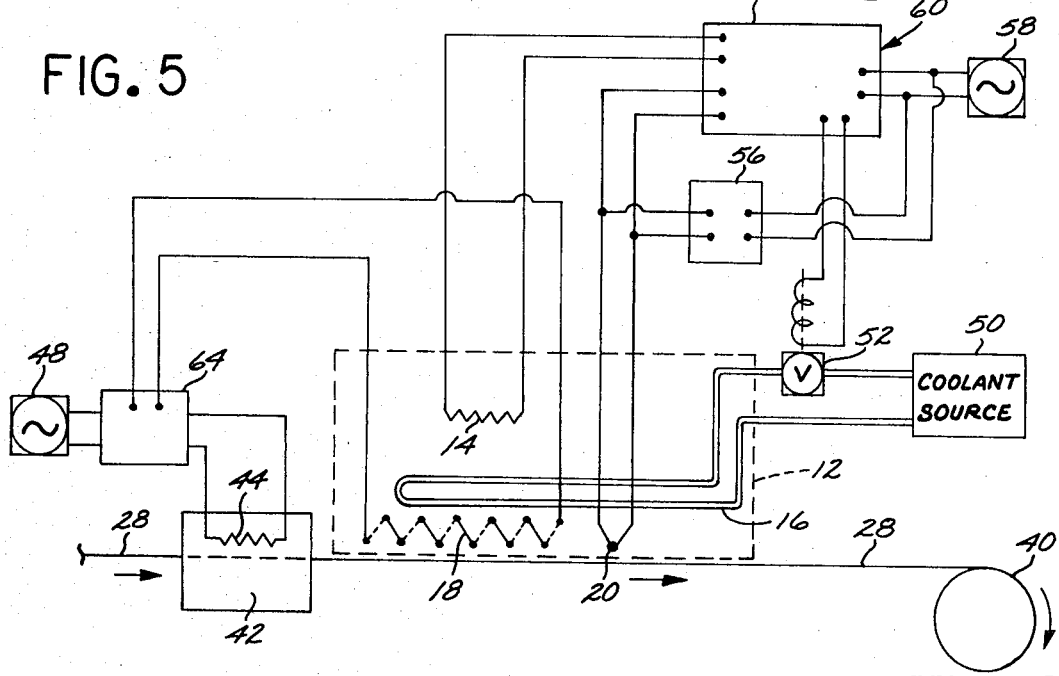

FIG. 6
FIG. 7
FIG. 8
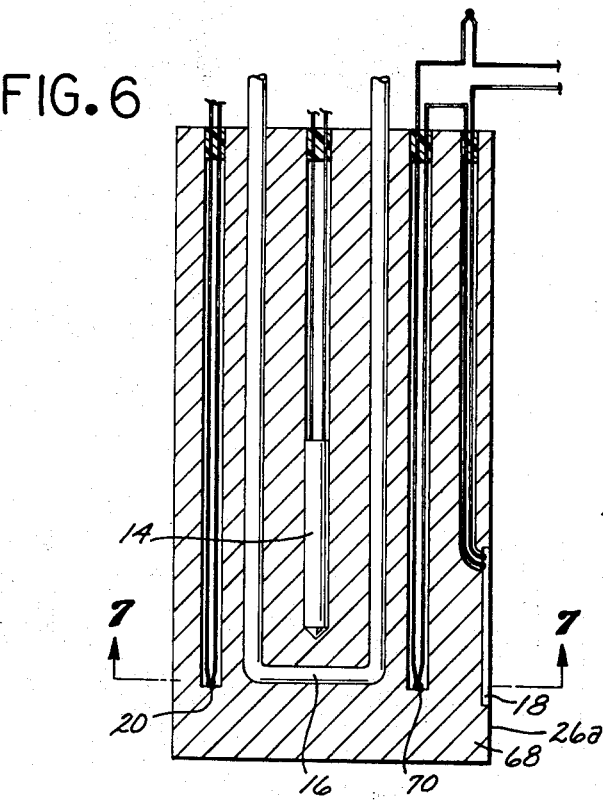
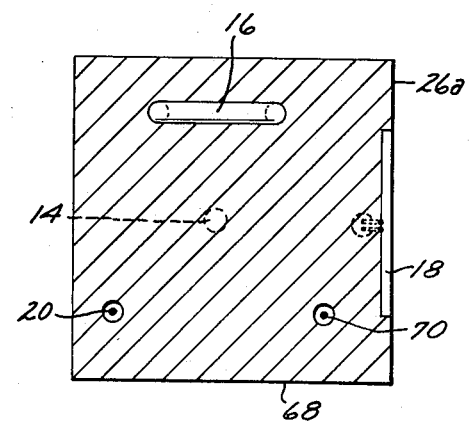
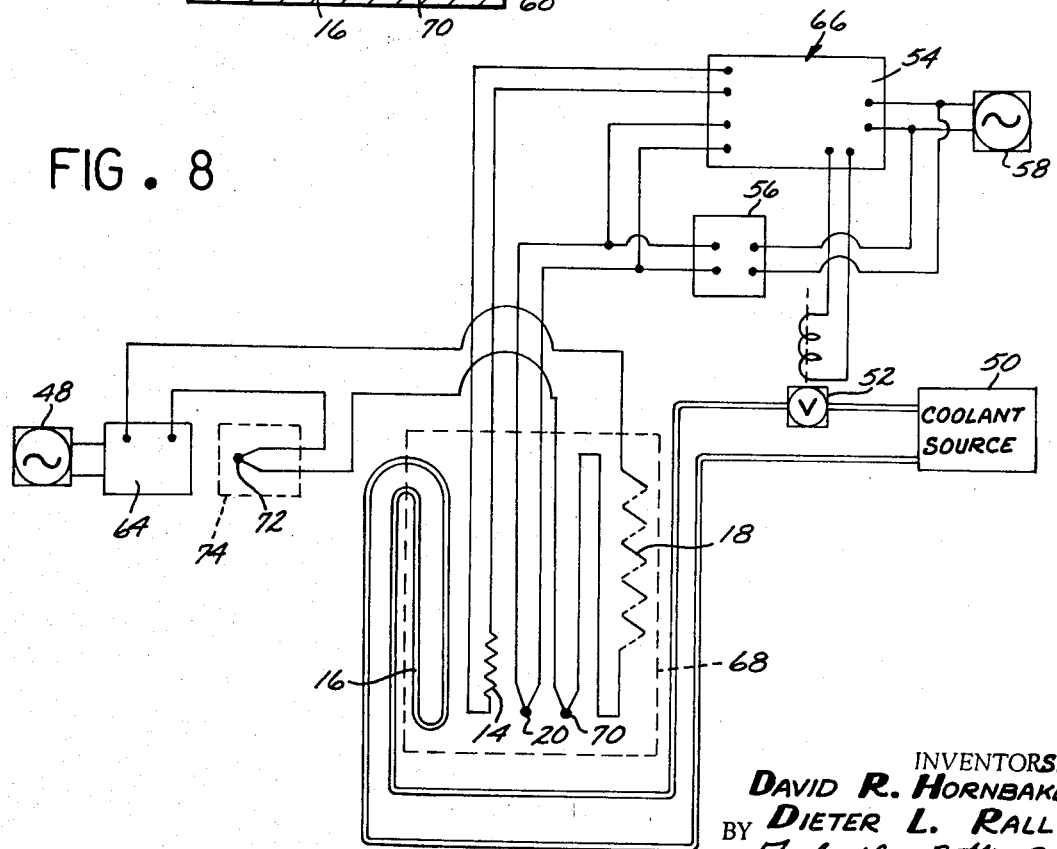
INVENTORS.
DAVID R. HORNBAKER
BY DIETER L. RALL
Fulwider, Patton, Rieber,
Lee and Utecht
ATTORNEYS

TEMPERATURE MEASUREMENT APPARATUS

BACKGROUND OF THE INVENTION

1. Field of the Invention

The present invention relates to temperature detection apparatus for monitoring or control of the temperature of an external medium or proximate body, and which is reactive to convective heat flow to determine when the body is at the same temperature as that of a reference body.

2. Description of the Prior Art

The temperature of stationary objects is presently measured by a variety of methods and apparatus, such as by attachment of a thermocouple, resistance thermometer, or like device directly to the object. Although this is satisfactory for most applications, such apparatus is usually not capable of both fast response to temperature change and also resistance to the abuse of practical use in a production facility. More particularly, where the apparatus is sufficiently rugged for production use in process control, for example, the consequent relatively large mass of the apparatus takes time to change temperature in response to any deviation of the measured body from the desired or "set point" temperature. Conversely, when the mass of the apparatus is reduced to improve its sensitivity, the apparatus usually lacks the ruggedness required in shop use. The apparatus of the prior art intended to solve this problem is consequently undesirably expensive and difficult to operate.

The foregoing problems are further compounded when it is necessary to detect the temperature of an object or external body without being able to physically contact the body, such as in the detection of inprocess temperatures of moving strip material. This situation is encountered, for example, in thermal forming and processing of plastics, tape, thin sheet and the like; in paper manufacturing, coating, and finishing; in adhesive application and curing, and in ink and paint drying, and the like. The surfaces of the body or material whose temperature is of interest are generally either flat, such as moving sheet material, or rounded, such as rotating rolls of processing equipment.

Heretofore, the so-called "noncontact" methods of detecting the temperature of a body relied upon the relationship between the absolute temperature of the body and the amount of energy it was radiating. Such devices develop a signal proportional to the temperature of the body and its surface emissivity, and are usually sensitive to radiation only over a relatively narrow spectral band width. Consequently, any changes in spectral emissivity affects the accuracy of the apparatus, such as the changes in color of the paper sheet in multicolor printing. Moreover, such radiation sensitive apparatus is not suited to determination of the temperature of a transparent body being heated by radiant heating devices located oppositely of the apparatus.

Even such prior art apparatus as exists for noncontact temperature detection is characterized by enclosure of the sensing element or elements in recesses or cavities in the sensing head. Consequently, such an element is undesirably subject to inaccuracies introduced by virtue of the particular orientation of the sensing head. That is, the pattern of convective heat flow in the recess or cavity changes relative to the sensing element in the cavity whenever the orientation of the sensing head is changed. Tedious recalibration is therefore necessary.

SUMMARY

According to the present invention, temperature detection apparatus is provided which includes a thermal sink or reference body mounting a heat flow sensor, and operative to determine the temperature of an external medium or body according to the principle that net heat exchange between the reference body and the external body will be zero when the bodies are at the same temperature. Although the apparatus may be placed with its heat flow sensor in physical contact with a stationary object to measure its temperature, the primary application for the apparatus is in noncontact detection of the temperature of moving bodies, whether the bodies be characterized by a flat surface or a curved surface.

The heat flow sensor of the apparatus is mounted to a sensing head having an operative surface adapted for placement in close proximity to the external body whose temperature is to be detected. The sensor is generally flush with the operative surface and is not located in a chamber or cavity. Consequently, the sensor is not undesirably subjected to different convective heat flow patterns whenever the orientation of the sensing head is altered. Therefore, recalibration of the apparatus for different orientations of the sensing head is unnecessary.

The temperature of the sending head is indicated by a temperature sensor associated with the head, and the head temperature is adjustable by heating and cooling means also associated with the head. Thus, an absence of heat flow between the head and the external body allows determination of the temperature of the external body by reading the temperature sensor output. Where it is desired to use the apparatus to adjust the temperature of the external body to conform to the temperature of the head, the heat sensor output is coupled to any usual null point process controller for this purpose.

Whether used for temperature monitoring or for control purposes, the proximity between the surfaces of the external body and the heat sensor renders the heat sensor quickly reactive to convective heat exchange. For most industrial applications heat convection levels are usually an order of magnitude greater than that for radiant heat exchange when operating at temperatures near the set or null point. Consequently, the apparatus is considerably more sensitive to temperature changes in this region than temperature detection apparatus which is substantially only reactive to radiant heat.

If desired, the heat sensor element can be coated with a reflective material to render it insensitive to radiant heat, while yet remaining sensitive and reactive to convective heat flow.

Although the present apparatus is adapted for placement either upon a stationary body or in close proximity to a moving body, it is also adapted for immersion in a liquid or gaseous medium to detect the temperature of that medium, as will be apparent.

In one embodiment of the present apparatus, the rapidity and sensitivity of response to temperature change is very greatly increased without affecting the rugged character of the sensing head or probe. This is done by having the heat flow sensor connected in series with a temperature sensor located in the head. The combined outputs of the two sensors provides a signal proportional to the sum of the temperature of the probe and the temperature differential between the probe and the surrounding fluid or external body whose temperature is to be measured. The level of the combined output signal at equilibrium is that of the temperature sensor. However, if the temperature of the media suddenly changes, this change will be reflected in the combined output signal even though the temperature sensor has not had time to react. This is extremely important in a process control operation, for example, since a control function can immediately be initiated despite the fact that the probe mass has not raised in temperature sufficiently to cause the temperature sensor to put out any increased signal. Accordingly, the apparatus provides fast response to temperature change of the external body, with the level of the output signal corresponding to the magnitude of the temperature sensor signal plus or minus the signal due to the temperature differential. The probe can therefore be made relatively massive and rugged to withstand the hard usage of production control applications, but can also be made highly sensitive by utilizing a heat sensor of relatively fast response.

Other objects and features of the invention will become apparent from consideration of the following description taken in connection with the accompanying drawings.

BRIEF DESCRIPTION OF THE DRAWINGS

FIG. 4 is a diagrammatic showing of the temperature detection apparatus used for monitoring the temperature of strip or sheet material;

FIG. 5 is a diagrammatic showing of the temperature detection apparatus used for controlling the temperature of strip or sheet material;

FIG. 6 is a longitudinal cross-sectional view of a sensor probe, according to a second embodiment of the present invention;

FIG. 7 is a view taken along the line 7–7 of FIG. 6; and

FIG. 8 is a diagrammatic showing of temperature detection apparatus utilizing the probe of FIG. 6 in a process for controlling the temperature of a fluid medium (not shown) surrounding the probe.

DESCRIPTION OF THE PREFERRED EMBODIMENTS

Figure 1:
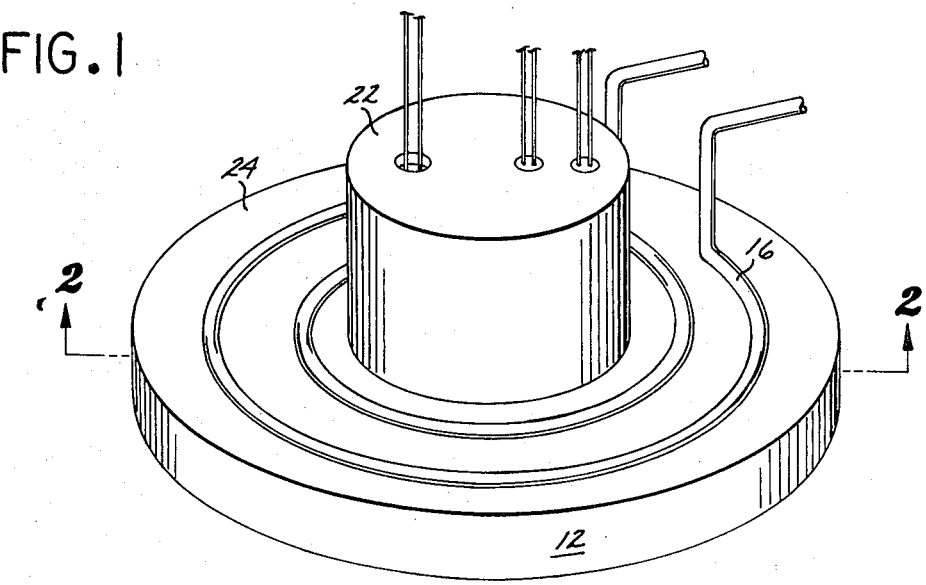
FIG. 1 is a perspective view of the sensor head of an embodiment of the temperature detection apparatus which is particularly adapted for detecting the temperature of a moving body without physical contact.
Figure 2:
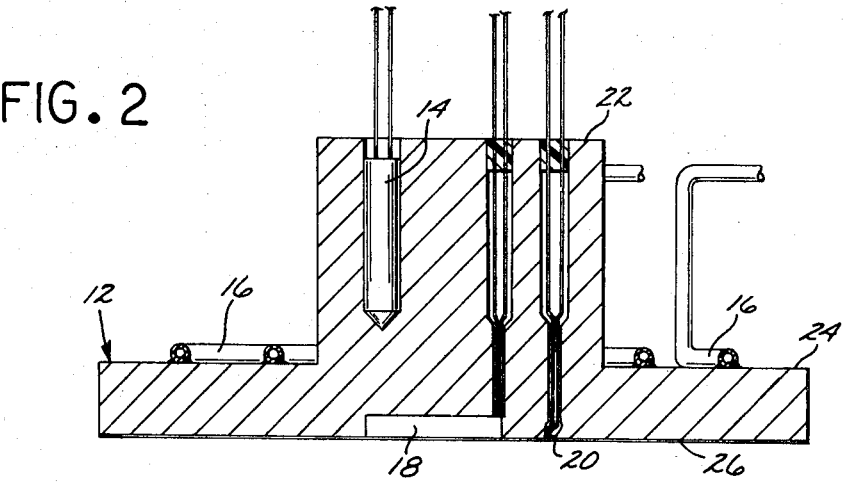
FIG. 2 is a transverse cross-sectional view of the sensor head of FIG. 1.
Figure 3:
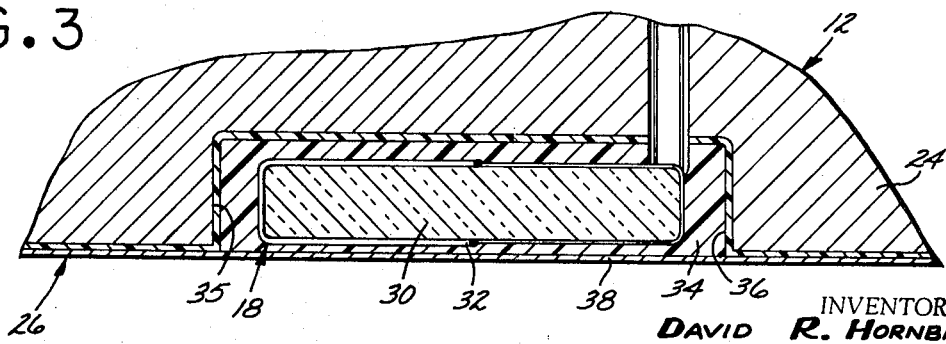
FIG. 3 is an enlarged detail cross-sectional view of the heat sensor mounted by the sensor head of FIG. 1.

Referring now to the drawings, and particularly to FIGS. 1 through 5, a temperature detection apparatus 10 is illustrated which comprises, generally, a thermally conductive reference body or sensor head 12; temperature change means for altering the temperature of the head 12, including an electrical resistance heating element or cartridge 14 and cooling coils 16; a heat flow sensor 18; and a temperature sensor 20.

As previously indicated, the apparatus 10 is adapted to detect the temperature of a surrounding medium or external body, whether it be a fluid, solid, or granular substance, by placement of the sensor head 12 against the external body or by immersion of the head 12 in the surrounding medium. However, the first embodiment of the invention is particularly fitted for use in monitoring or controlling the temperature of a moving body without actually physically contacting such body.

Thus, the sensor head 12 is a thermally conductive reference body made of material such as aluminum, copper or the like, and constitutes a thermal sink into and out of which heat flow can occur.

The sensor head 12 includes a generally cylindrical upper portion 22 which is integral with a larger diameter dislike base 24 having an underside which constitutes an active or operative face 26. The operative face 26 is placed closely proximate to the body whose temperature is to be measured, the body in the present exemplary showing being a sheet 28 of plastic material which is moved past the operative face 26, as will be more completely described hereinafter.

The cartridge heater 14 may be any suitable heater for raising the temperature of the mass of the head 12, the cylindrical form shown being conveniently disposed within a vertically oriented bore provided in the upper portion 22 of the head 12 in thermal exchange relation with the sides or walls of the bore. Any of various other means could also be used for raising the temperature of the head 12, such as fluid-heating passages provided in the head.

The particular form of heat flow sensor utilized is not critical to the present invention, so long as it is capable of sensing the heat flow resulting from a temperature differential between the plastic sheet 28 and the mass of the head 12. The sensor 18 illustrated is a thermoelectric device or thermopile adapted to generate a voltage proportional to heat flow. As best viewed in FIG. 3, it includes a central wafer 30 and a winding 32. The wafer 30 is made of a thermal and electrical insulating material, such as a phenolic resin impregnated body, across which the winding 32 measures the temperature drop to thereby determine the heat flow. The winding 32 is constantan wire, with portions of the wire plated with copper, and with the junctions of the plated and unplated portions located on opposite sides of the wafer 30 so that heat flow across the wafer and the turns of wire 32 result in a temperature difference between the hot and cold junctions. The temperature difference produces a voltage proportional to the rate of heat flow.

The heat flow sensor 18 is potted or embedded in an epoxy resin 34 or the like which fills a receptacle 36 provided in the underside of the head 12. The walls of the receptacle 36 and the adjacent face 26 are covered by an anodize coating 35 to provide electrical insulation. It is particularly noted that the sensor 18 is thus exposed to heat flow in the area of the operative face 26, but the sensor outer face and the associated resin 34 are flush with the face 26. This eliminates any empty space within which undesired convective heat flow patterns could occur.

The apparatus 10 can be allowed to be reactive to radiant energy from the plastic sheet 28, as will be seen, even though radiant heat flow is not a significant portion of the total heat flow measured by the sensor 18. However, there are situations where reactivity to radiant heat is undesired. For example, where the plastic sheet 28 or like body is heated by radiant heating devices located oppositely of the apparatus 10, the apparatus 10 would undesirably impute to the sheet 28 the heat flow from such heating devices. To prevent this the underside of the head 12 is provided with a thin reflective aluminum coating 38 which is operative to reject the radiant heat flow component without affecting the larger and more significant convective-conductive heat flow components.

Where the apparatus 10 is to be used as a controller to maintain the temperature of the sheet 28 at some predetermined set-point temperature, as will subsequently be described in connection with the embodiment of FIG. 5, and where the usual temperature of the environment surrounding the head is always less than the set-point temperature, no cooling of the head 12 is required. However, where the apparatus 10 is to be used as a temperature monitor, as in the present embodiment, the sensor head 12 must be reduced as well as raised in temperature to match that of the sheet 28, and the cooling coils 16 afford a means to accomplish temperature reduction. Such cooling can be accomplished in any suitable manner, although it has been found that the illustrated integral attachment of the cooling coils 16 to the upper side of the head base 24 operates very satisfactorily.

The temperature sensor 20 is disposed within and in thermal exchange relation with the walls of a vertically oriented bore provided in the head 12. The sensor 20 is preferably a conventional thermocouple whose junction is located relatively close to the operative face 26. The sensor 20 generates a voltage proportional to its temperature and could, if desired, also take the form of a resistance thermometer or other means suitable for the purpose described.

Although not shown, a suitable mounting bracket and adjusting mechanism is used to mount the sensor head 12 to suitable support structure (not shown), and to position the operative face 26 relative to the sheet 28.

As best seen in FIG. 4, the sheet 28 is drawn past the operative face 26 by a process takeup roll 40 after having passed through a process heater 42. The heater 42 includes a resistance element 44 in circuit with a suitable manually operated heater control 46 for varying the power drawn from a suitable source 48 of electrical energy.

The coolant for the coils 16 can be air, water, or the like, depending upon the degree of cooling desired. Assuming it is water, the coolant is drawn from a source 50 and passes through a conventional solenoid valve 52. The valve 52 is operated by a conventional controller 54 to which it, the heater 14, and the sensor 18 are electrically coupled.

The particular form of controller 54 is not a part of the present invention. It need only be operative in response to the output of the heat flow sensor 18 to actuate either the heater 14 or the coolant solenoid valve 52, according to whether the temperature of the sensor head 12 is lower or greater than the temperature of the plastic sheet 28.

The temperature of the sensor head 12 is displayed by a temperature readout 56 which is electrically coupled to the temperature sensor 20 and to a suitable source 58 of electrical energy. The controller 54 is also electrically coupled to the source 58.

The apparatus 10 operates on the principle that no heat will be exchanged between two surfaces in close proximity and at the same temperature. Thus, when the operative face 26 and the sheet 28 are approximately 1/16- to 1/8-inch apart, an exchange of heat occurs only if there is a difference in their temperatures. Since any exchange of heat must flow through the heat flow sensor 18, the voltage or signal generated by the sensor 18 is directly proportional to the direction and magnitude of the heat flow.

Application of the output signal of the heat flow sensor 18 to the controller 54 causes the heat sink or head 12 to be changed in temperature in order to match or "follow" the temperature changes of the sheet 28. This is done by the action of the controller 54 in heating and cooling the head 12 until a null-balance condition exists in which there is no output from the sensor 18. In effect the head 12 is thermally but not mechanically coupled to the sheet 28.

As previously mentioned, the heat flow to which the present apparatus 10 is primarily reactive is conduction-convection heat transfer. This type of heat flow results because of a temperature differential between the sheet 28 and the ambient air. That is, air is caused to move or convect and produce a boundary layer adjacent the sheet 28. However, if a closely proximate body such as the surface 26 of the sensor head 12 is heated to the same temperature as the sheet 28, the surface 26 also develops a boundary layer. Since the two layers are at the same temperature, placement of the sheet 28 close to the face 26 does not result in any heat exchange. This lack of heat exchange under these conditions also exists even when one of the surfaces moves relative to the other. This principle is utilized in the present invention to alter the temperature of one of the surfaces until there is no heat exchange, at which point it is then known that the temperature of the other proximate surface is the same.

Although some heat is transferred between adjacent surfaces by radiation, the amount compared to convective heat transfer is of an order of magnitude less. Consequently, the apparatus 10 is greatly more sensitive to temperature change as compared to a system reactive primarily to radiant heat transfer. If desired, even the radiant heat exchange can be cut off by applying the reflective coating 38 across the operative face 26, as previously indicated.

Referring now to FIG. 4, when the apparatus 10 is used as a temperature monitor, the output signal from the heat flow sensor 18 causes the sensor head to heat or cool and "track" to the temperature of the sheet 28. The temperature of the head 12, and thus the temperature of the sheet 28, is continuously displayed on the readout 56 so that an operator can adjust the degree to which the sheet 28 is heated by operating the heater control 46.

If desired, the output signal from the temperature sensor 20 could be connected to a second controller (not shown) to automatically control the temperature of the sheet 28, as will be apparent. However, where it is desired to have the apparatus of the present invention function to control a process, such as to control the heat applied to the sheet 28 to bring it to a set-point temperature at which the head 12 is maintained, the second controller (not shown) is preferably actuated by the output of the heat flow sensor 18. Such a system is shown in FIG. 5.

More particularly, the temperature detection apparatus of FIG. 5, which is generally designated by the numeral 60, is in most respects substantially identical to the apparatus 10 just described. Consequently, like reference numerals are employed where there is such substantial identity.

The apparatus 60 is used to control the heating of the sheet 28 in order to maintain it at some predetermined or set-point temperature at which the head 12 is maintained. The head 12 is maintained at the desired set-point temperature by coupling the output of the temperature sensor 20 directly to a set-point controller 62. The controller 62 is suitably coupled to the heater 14 and the solenoid valve 52 to thereby cause heat to be added to or drawn from the head 12 to maintain the head 12 at the set-point temperature.

The output of the heat flow sensor 18, which reflects any deviation of the temperature of sheet 28 from the set-point temperature, is coupled to a second or process controller 64, and the controller 64 turns on or turns off the heater 44 to bring the temperature of the sheet 28 to the required set-point temperature. Although not shown, the controller 64 can also be utilized to actuate cooling means to bring down the temperature of the sheet 28, if that is what the particular application requires. Again, the detailed construction of the controllers 62 and 64 will not be gone into, since controllers for the purposes indicated are well known to those skilled in the art. A recitation of the desired function is sufficient to enable one skilled in the art to select the appropriate controller from those presently available on the market.

By using the null-heat-balance principle described, the absolute values of the heat exchange and of the generated signals are not critical to the operation of the present apparatus. A null-heat-balance condition is automatically sought regardless of such values, and regardless of such conditions as process velocity, head-to-surface spacing, and the like.

Referring now to FIGS. 6 through 8, a temperature detection apparatus 66 is illustrated which comprises, generally, an elongated thermal sink or probe 68 made of aluminum or copper or other good thermal conductor and mounting the heat flow sensor 18 in flush relationship to a face 26a thereof. The probe 68 includes an elongated bore to receive the temperature sensor 20, and a similar elongated bore to receive a temperature sensor 70. The sensor 70 is identical to the sensor 20 in the embodiment illustrated, but the sensor 70 can be any sensor adapted to generate a signal directly proportional to the temperature of the body within which it is situated.

The leads to the sensor 20 are coupled to the temperature readout 56 and also to the set-point controller 54 so that the output signal from the sensor 20 can be utilized by the controller 54 to maintain the mass of the probe 68 at a predetermined set-point temperature through actuation of the heater 14 or the coolant solenoid valve 52, as required. This function is like that described in connection with the apparatus 60 of FIG. 5.

The temperature sensor 70 is connected in series with the heat flow sensor 18, an external thermocouple reference junction 72 which is immersed in an ice bath 74 or the like, and the process controller 64 so that the algebraic sum of the outputs of the heat flow sensor 18 and the temperature sensor 70 are applied to the controller 64.

Although the apparatus 66 is useful in determining the temperature of a stationary body or a moving body, and in either a temperature monitoring or a temperature controlling function, the exemplary showing of the probe 68 of FIGS. 6 through 8 is concerned with the temperature control of a medium in which the probe 68 is immersed. The medium (not shown) could be a gas or a liquid, but will be referred to as a liquid for convenience. As will be seen, the series connection of the sensors 18 and 70 renders the probe 68 very sensitively responsive to any changes in the temperature of the surrounding liquid, despite the fact that the mass of the probe 68 is comparatively large.

More particularly, if the temperature of the probe 68 and that of the liquid bath are the same there will be no heat exchange and the combined output of the series-connected sensors 18 and 70 will be only that of the sensor 70. However, if the temperature of the liquid suddenly rises, the sensor 18 generates a positive signal proportional to the temperature error, that is, the temperature differential between the liquid and the set-point temperature of the mass of the probe 68. The resulting combined output of the sensors 18 and 70, which will be proportional to the temperature of the probe 68 plus such temperature error between the probe and the liquid, is applied to the process controller 64. The controller 64 is actuated by this combined output to operate any suitable cooling means (not shown) to lower the temperature of the liquid. As the temperature of the liquid and that of the probe 68 come to equilibrium, the heat flow error signal from the sensor 18 approaches zero and the combined output signal of the sensors 18 and 70 again becomes only that of the sensor 70. This latter signal is then proportional to the new liquid temperature.

Conversely, if there is a sudden decrease in the temperature of the liquid in which the probe 68 is immersed, the combined signal of the sensors 18 and 70 will be utilized by the process controller 64 to operate any suitable heating means (not shown) to raise the temperature of the liquid, as will be apparent.

With the foregoing arrangement, the apparatus 66 is sensitively responsive to any change in the temperature of the media surrounding the probe 68. This is because the response time of the apparatus 66 is dictated by the very sensitive heat flow sensor 18 and not by a temperature sensor whose output only occurs when the mass surrounding it experiences some change in temperature. Sensors like the sensor 18 can be commercially obtained with a time constant of 0.5 seconds or less so that when combined with a conventional process temperature sensor 70 having a time constant of a minute or more, sudden media temperature changes can be detected and corrective actuation of the controller 64 initiated in less than 0.5 seconds.

If desired, the magnitude of the output signal from the sensor 18 can be made arbitrarily large by increasing the sensitivity of the sensor 18 without having to alter the mass of the probe 68. Thus, it is possible to obtain a relatively large change in the combined output signal for a relatively small change in media temperature.

The presence of an output signal from the temperature sensor 70 even in the absence of any heat exchange between the probe 68 and the surrounding media is an important feature. That is, most prior art process controllers are presently actuated by conventional thermocouple-type sensors and for failsafe operation require a sensor signal of some kind at all times. Consequently, since the sensor 70 is always characterized by a signal corresponding to the temperature of the mass of the probe 68, the apparatus 66 can be directly substituted in such prior art systems to thereby convert such systems into fast, high sensitivity temperature control systems in accordance with the present invention. As will be apparent, the system associated with the probe 68 could also be used with a reference body such as the head 12, if desired.

The term "signal" is intended to be broadly construed to cover or encompass sensors whose outputs are mechanical movements or "signals." For example there are heat flow sensors characterized by a mechanical output or movement in response to differential expansion of a pair of bodies. Likewise, temperature sensors of the bimetallic thermometer type have an output which is a mechanical movement. As will be apparent, these mechanical movements of the sensor can also be mechanically linked in the same way as their electrical counterparts. Consequently, the present invention comprehends utilization of such mechanical sensor in place of, in addition to, or in combination with the sensors previously mentioned. The particular type of heat flow sensor or temperature sensor utilized in the various embodiments herein described need only be capable of providing an output directly proportional to heat flow, in the case of a heat sensor, or directly proportional to the temperature of the head or probe, in the case of the temperature sensor. Also, as will be apparent, the apparatus 66 can be used with a variety of process controllers to allow rapid on-off, proportional, proportional with reset, or other mode of process control.

Various modifications and changes may be made with regard to the foregoing detailed description without departing from the spirit of the invention or the scope of the following claims.

We claim:
1. Temperature detection apparatus comprising:
a thermally conductive reference body having an operative face adapted for association in convective heat exchange relation with an external medium or body;
heat flow sensor mounted to said reference body in heat exchange relation therewith, substantially flush with said operating face, and reactive, regardless of temperature, to measure the convective heat flow to or from said reference body to generate an output signal, an absence of said output signal thereby indicating temperature correspondence between said reference body and the medium or external body with which said operative face is associated; and
temperature change means operative to change the temperature of said reference body to such a condition that the value of said output signal approaches zero.

2. Temperature detection apparatus according to claim 1 and including a radiant heat reflective coating over said operative face and said heat flow sensor whereby said heat flow sensor is not reactive to radiant heat flow.

3. Temperature detection apparatus according to claim 1 and including a first controller and means coupling said temperature change means and said heat flow sensor to said first controller for operating said temperature change means in accordance with the direction and magnitude of said output to thereby change the temperature of said reference body to correspond with the temperature of the external medium or body.

4. Temperature detection apparatus according to claim 1 and wherein said temperature change means includes means carried by said reference body for changing the temperature thereof.

5. Temperature detection apparatus according to claim 1 wherein said heat flow sensor is a thermopile.

6. Temperature detection apparatus according to claim 1 and including a temperature indicator and a temperature sensor mounted to said reference body in thermal exchange relation to generate an output proportional to the temperature of said reference body, said output of said temperature sensor being coupled to said temperature indicator to indicate the temperature of said reference body.

7. Temperature detection apparatus according to claim 3 and including an external controller and a temperature sensor mounted to said reference body in thermal exchange relation to generate an output proportional to the temperature of said reference body, said output of said temperature sensor being coupled to said external controller to adjust a process condition of a process being controlled by said apparatus.

8. Temperature detection apparatus comprising:
a thermally conductive reference body having an operative face adapted for association in convective heat exchange relation with an external medium or body;
a heat flow sensor mounted to said reference body in heat exchange relation therewith, substantially flush with said operating face, and reactive to convective heat flow adjacent said face to generate an output, an absence of said output thereby indicating temperature correspondence between said reference body and the medium or external body with which said operative face is associated;
temperature change means operative to change the temperature of said reference body;
a first temperature sensor mounted to said reference body in thermal exchange relation and adapted to generate an output proportional to the temperature of said reference body;
a first controller coupled to said first temperature sensor and to said temperature change means and actuable by said output of said first temperature sensor to operate said temperature change means to maintain said reference body at a predetermined set-point temperature; and external temperature change means operable to initiate temperature changes in said medium or external body whereby the temperature thereof may be varied in accordance with the direction and magnitude of said output of said heat flow sensor.

9. Temperature detection apparatus according to claim 6 wherein said temperature sensor is a thermocouple.

10. Temperature detection apparatus comprising:

a thermally conductive reference body having an operative face adapted for association in heat exchange relation with an external medium or body;

a heat flow sensor mounted to said reference body adjacent said operative face and reactive to heat exchange adjacent said face to generate an output proportional to said heat exchange;

a temperature sensor mounted to said reference body in thermal exchange relation to generate an output proportional to the temperature of said reference body; and means for coupling the outputs of said heat flow sensor and said temperature sensor whereby their combined outputs are proportional to the algebraic sum of the temperature of said reference body and the temperature differential between said reference body and the external medium or body.

11. Temperature detection apparatus according to claim 10 wherein said heat flow sensor is a thermopile.

12. Temperature detection apparatus according to claim 10 wherein said temperature sensor is a thermocouple.

13. Temperature detection apparatus according to claim 10 wherein said heat flow sensor is a thermopile and said temperature sensor is a thermocouple including reference junction compensation.

14. Temperature detection apparatus according to claim 10 and including temperature controller means operative to maintain said reference body at a predetermined set-point temperature; and means for applying said combined outputs to an external controller for adjusting the temperature of said external medium or body.

15. Temperature detection apparatus according to claim 14 wherein said temperature controller means includes change means operative to change the temperature of said reference body; a set point controller; and a second temperature sensor mounted to said reference body in thermal exchange relation to generate a control output proportional to the temperature of said reference body for application to said set point controller to operate said change means.

16. Temperature detection apparatus according to claim 8 and including a second controller coupled to said external temperature change means and to said heat flow sensor and actuable by said output of said heat flow sensor to operate said external temperature change means and thereby initiate said desired temperature changes in said medium or external body in accordance with the direction and magnitude of said output of said heat flow sensor.

17. Temperature detection apparatus according to claim 8 and including a second temperature sensor mounted to said reference body in thermal exchange relation and adapted to generate an output proportional to the temperature of said reference body; and means for coupling the outputs of said heat flow sensor and said second temperature sensor whereby their combined outputs are proportional to the algebraic sum of the temperature of said reference body and the temperature differential between said reference body and the external medium or body, said combined outputs being utilizable in operating said external temperature change means.

18. Temperature detection apparatus according to claim 17 and including a second controller coupled to said external change means and to said heat flow sensor and said second temperature sensor and actuable by said combined outputs to operate said external temperature change means and thereby initiate said desired temperature changes in said medium or external body in accordance with the direction and magnitude of said combined outputs.

19. Temperature detection apparatus according to claim 8 and including a radiant heat reflective coating over said operative face and said heat flow sensor whereby said heat flow sensor is not reactive to radiant heat flow.

20. Temperature detection apparatus according to claim 8 and wherein said temperature change means includes means carried by said reference body for changing the temperature thereof.

21. Temperature detection apparatus according to claim 8 wherein said heat flow sensor is a thermopile.

22. Temperature detection apparatus according to claim 8 wherein said first temperature sensor is a thermocouple.